(12) United States Patent
Matsumoto

(10) Patent No.: US 6,276,809 B1
(45) Date of Patent: Aug. 21, 2001

(54) ILLUMINATING LIGHT GUIDE FOR INSTRUMENT PANEL

(75) Inventor: Makoto Matsumoto, Okazaki (JP)

(73) Assignee: Denso Corp., Kariya (JP)

( * ) Notice: Subject to any disclaimer, the term of this patent is extended or adjusted under 35 U.S.C. 154(b) by 0 days.

(21) Appl. No.: 09/479,923

(22) Filed: Jan. 10, 2000

(30) Foreign Application Priority Data

Jan. 11, 1999 (JP) .................................................. 11-004664

(51) Int. Cl.⁷ .................................................. G01D 11/28
(52) U.S. Cl. .............................. 362/26; 362/23; 362/29; 362/30; 362/499
(58) Field of Search .................. 362/23, 26, 29, 362/30, 459, 487, 489; 40/361, 366, 362, 541, 546, 547; 368/67, 84, 227, 223; 116/200, 202, 250, 251

(56) References Cited

U.S. PATENT DOCUMENTS

| | | | |
|---|---|---|---|
| 4,323,951 | * 4/1982 | Pasco | 362/27 |
| 4,404,522 | * 9/1983 | Pucciarello | 314/114 |
| 5,915,822 | 6/1999 | Ogura et al. | 362/26 |

FOREIGN PATENT DOCUMENTS

| | | |
|---|---|---|
| 4121248 | 6/1991 | (DE) . |
| 4433150 | 9/1994 | (DE) . |
| 2506009 | 5/1982 | (FR) . |
| 09-21655 | 1/1997 | (JP) . |
| 09-287981 | 11/1997 | (JP) . |

OTHER PUBLICATIONS

Journal Of Nippondenso Technical Disclosure 58–113 (published Mar. 15, 1988).

* cited by examiner

Primary Examiner—Stephen Husar
Assistant Examiner—Ismael Negron
(74) Attorney, Agent, or Firm—Law Office of David G. Posz

(57) ABSTRACT

A meter that has a dial plate, a pointer, a light transmitting plate disposed at a rear side of the dial plate and a light source. The light transmitting plate has a shaft hole into which a shaft of the pointer is inserted, and a convex portion formed into a substantially conical shape protruding toward a rear side of the light transmitting plate in the vicinity of the shaft hole. The light source is disposed at a rear side of the light transmitting plate to face the convex portion. Light emitted by the light source enters the light transmitting plate from the convex portion at a relatively large incidence angle and illuminates the dial plate from the rear side of the dial plate.

17 Claims, 5 Drawing Sheets

REAR ← → FRONT

REAR ⟵⟶ FRONT

REAR ⟵ FRONT

ILLUMINATING LIGHT GUIDE FOR INSTRUMENT PANEL

CROSS REFERENCE TO RELATED APPLICATIONS

This application relates to and claims priority from Japanese Patent Application No. 11-4664 filed on Jan. 11, 1999, the contents of which are hereby incorporated by reference.

BACKGROUND OF THE INVENTION

1. Field of the Invention

The present invention relates generally to meters, and particularly to a meter having a dial plate illuminated from back by a light source and a light transmitting plate. The present invention is suitably applied to a meter disposed on an instrumental panel of a vehicle.

2. Related Art

JP-A-9-21655 discloses an illumination structure for a meter used as a speedometer of a vehicle. In the meter, a light transmitting plate is layered at a rear side of a dial plate, and plural light sources are disposed below the light transmitting plate. Light from the light sources is introduced into the light transmitting plate, and is reflected by the light transmitting plate toward the dial plate. As a result, translucent indication marks and graduations formed on the dial plate are illuminated from back. Light from the light sources is also introduced into a light transmitting pointer disposed on the dial plate, and illuminates the pointer. The light sources are disposed around a shaft of the pointer, and the light transmitting plate has a shaft hole through which the shaft of the pointer passes. Light from the light sources is introduced into the light transmitting plate from the shaft hole.

However, since the light transmitting plate around the shaft hole is formed flat, incidence efficiency of light from the light sources into the light transmitting plate is poor. Especially, when the light sources are light-emitting diodes (LEDs), a large number of the LEDs may need to be used to increase amount of light introduced into the light transmitting plate, because the LED is generally smaller in size and emission area than a lamp. As a result, the number of the light sources may be increased, thereby increasing manufacturing cost of the meter.

SUMMARY OF THE INVENTION

In view of the foregoing problems, it is an object of the present invention to provide a meter having a dial plate sufficiently illuminated by a minimum light source.

According to the present invention, a meter has a dial plate, a pointer, a drive unit from which a shaft of the pointer protrudes, a light transmitting plate disposed at a rear side of the dial plate and a light source for emitting light. The light transmitting plate has a shaft hole into which the shaft is inserted to be engaged with the pointer, and a convex portion disposed in the vicinity of the shaft hole, and formed into a substantially conical shape protruding toward a rear side of the light transmitting plate. The light source is disposed to face the convex portion.

As a result, when the light source emits light, light enters the light transmitting plate from the convex portion at a relatively large incidence angle. Therefore, even when the light source is a single small light-emitting diode, a sufficient amount of light is introduced into the light transmitting plate, and the dial plate is sufficiently illuminated.

Preferably, the pointer is made of a light transmitting material, and the light transmitting plate has a first light reflecting portion formed around the shaft hole to protrude toward the pointer for reflecting light toward a base portion of the pointer. As a result, light reflected by the light reflecting portion is introduced into the pointer, and the pointer is sufficiently illuminated.

BRIEF DESCRIPTION OF THE DRAWINGS

This and other objects and features of the present invention will become more readily apparent from a better understanding of the preferred embodiment described below with reference to the accompanying drawings, in which.

DETAILED DESCRIPTION OF THE PREFERRED EMBODIMENT

A preferred embodiment of the present invention is described hereinafter with reference to the accompanying drawings.

Figure 1:
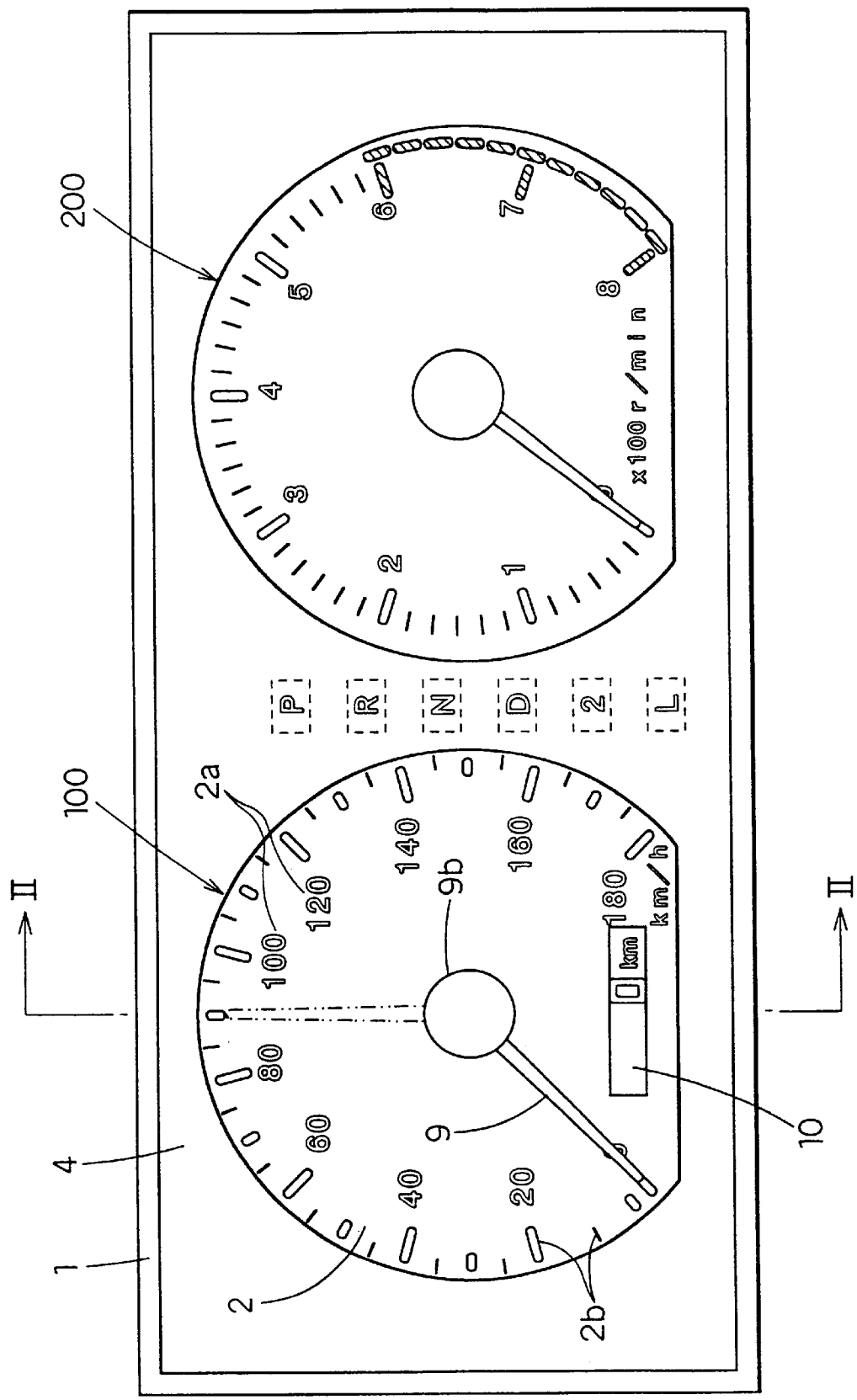
FIG. 1 is a front view showing a speedometer and a tachometer for a vehicle according to a preferred embodiment of the present invention.
Figure 2:
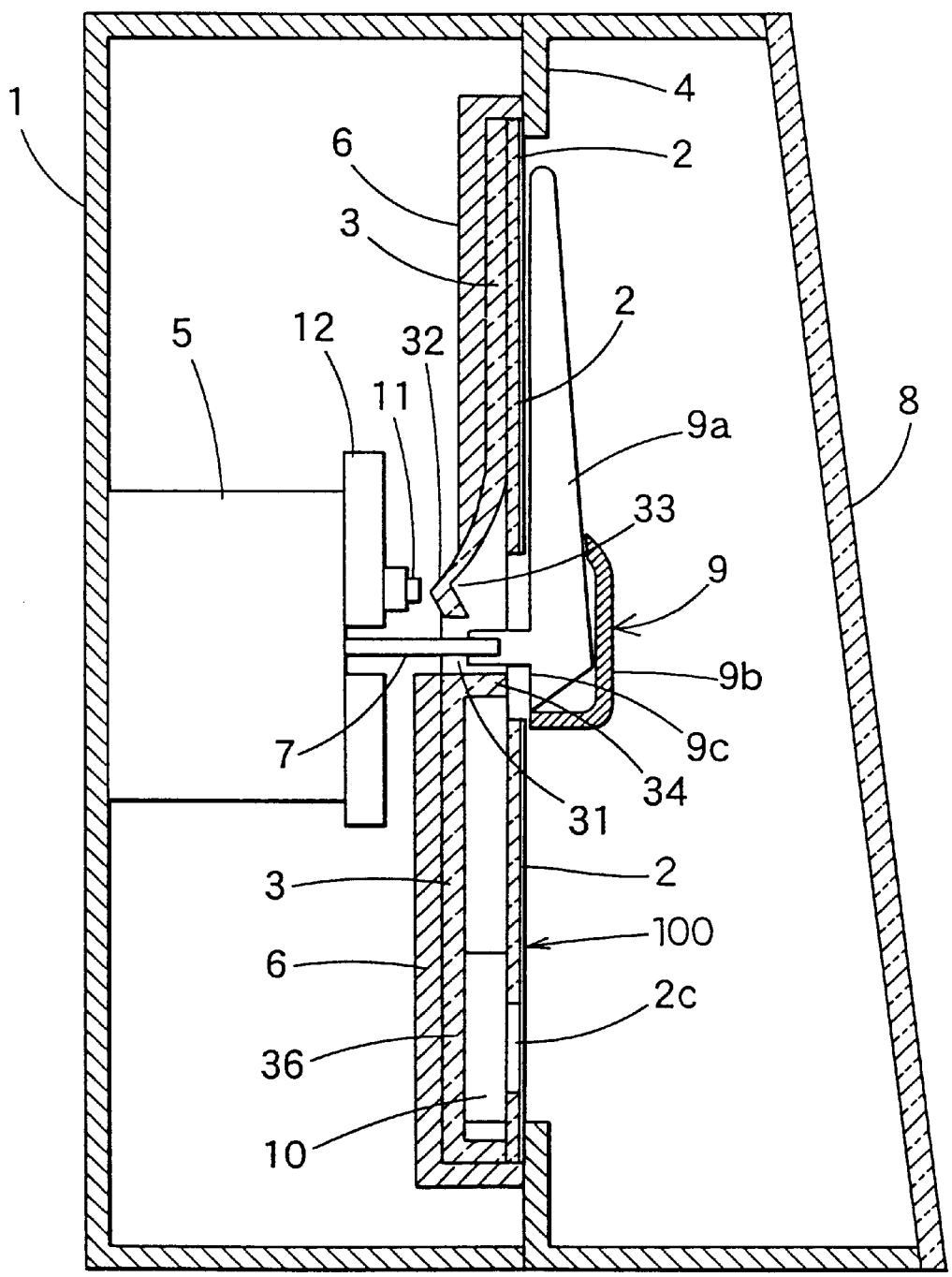
FIG. 2 is a sectional view taken along line II—II in FIG. 1.

As shown in FIG. 1, a speedometer 100 and a tachometer 200 for a vehicle are disposed in a meter case 1. As shown in FIG. 2, a drive unit 5 for the speedometer 100 is disposed at a substantial center of the case 1 in a vertical direction. In FIG. 2, a passenger in the vehicle is on a front side of the meter 100. A dial plate 2 is attached to a front side of the case 1, and a light transmitting plate 3 is layered at a rear side of the dial plate 2. A rear side surface of the light transmitting plate 3 is covered by a rear cover 6. Further, a holding plate 4 is connected to the case 1 from front to hold a peripheral portion of the dial plate 2. A transparent cover 8 is attached to a front side of the holding plate 4.

The dial plate 2 is a thin transparent synthetic resin plate. As shown in FIG. 1, indication marks 2a and graduations 2b are formed on a front side surface of the dial plate 2 using a translucent material. The whole front side surface of the dial plate 2 except the indication marks 2a and the graduations 2b is coated by shading paint. The dial plate 2 has a cut-out portion 2c in a lower part thereof so that a liquid crystal display 10 is inserted into the cut-out portion 2c.

Figure 3:
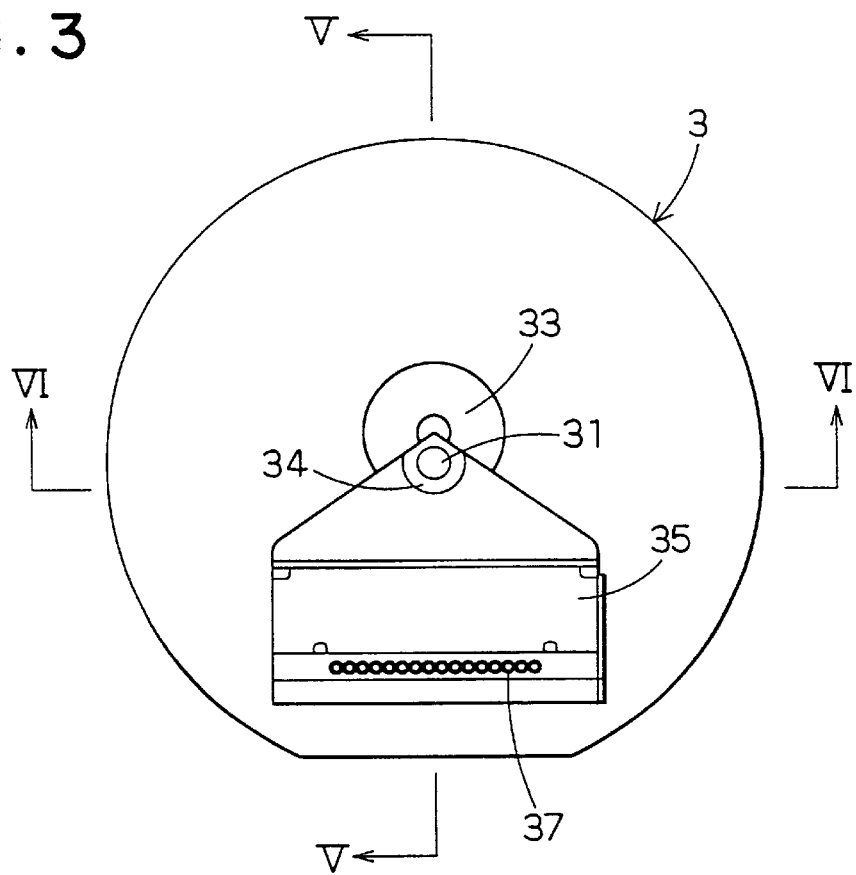
FIG. 3 is a front view showing a light transmitting plate of the speedometer according to the present embodiment.
Figure 4:
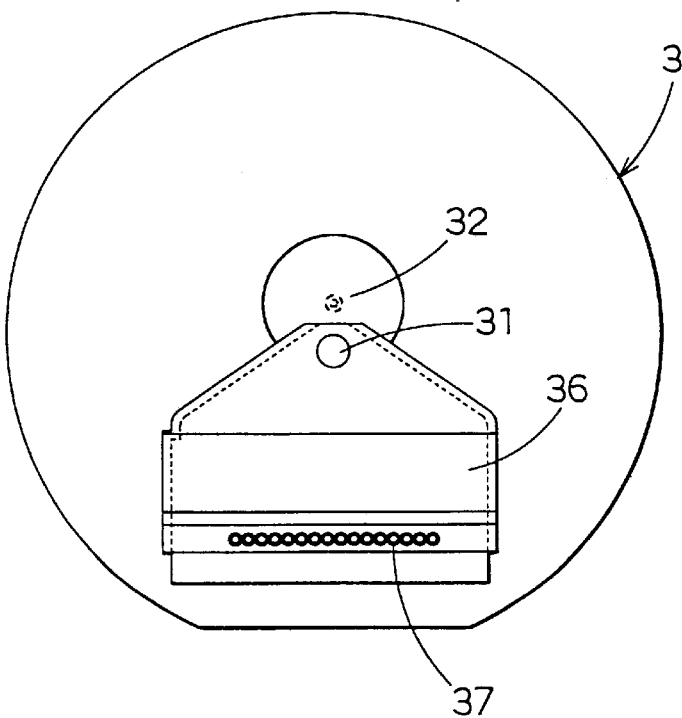
FIG. 4 is a rear view showing the light transmitting plate according to the present invention.

As shown in FIGS. 3 and 4, the light transmitting plate 3 is formed into a substantially circular shape using transparent synthetic resin such as acrylic acid resin and polycarbonate. The light transmitting plate 3 has a shaft hole 31 at a substantial center of the plate 3 so that a pointer shaft 7 projecting from the drive unit 5 passes through the shaft hole 31. Further, the light transmitting plate 3 has a convex portion 32 immediately above the shaft hole 31. As shown in FIG. 2, the convex portion 32 is formed into a substantially conical shape which protrudes toward a rear side in such a manner that a gentle curved portion is formed between a flat portion of the plate 3 and the convex portion 32. A light source 11 is a light-emitting diode (LED), and is secured to a substrate 12 disposed at a front side of the drive unit 5. The light source 11 is disposed to face the convex portion 32, so that light from the light source 11 enters the light transmitting plate 3 from the convex portion 32. The convex portion 32 also forms a concave portion 33 at a front or reverse side of the convex portion 32. The concave portion 33 communicates with the shaft hole 31.

Figure 5:
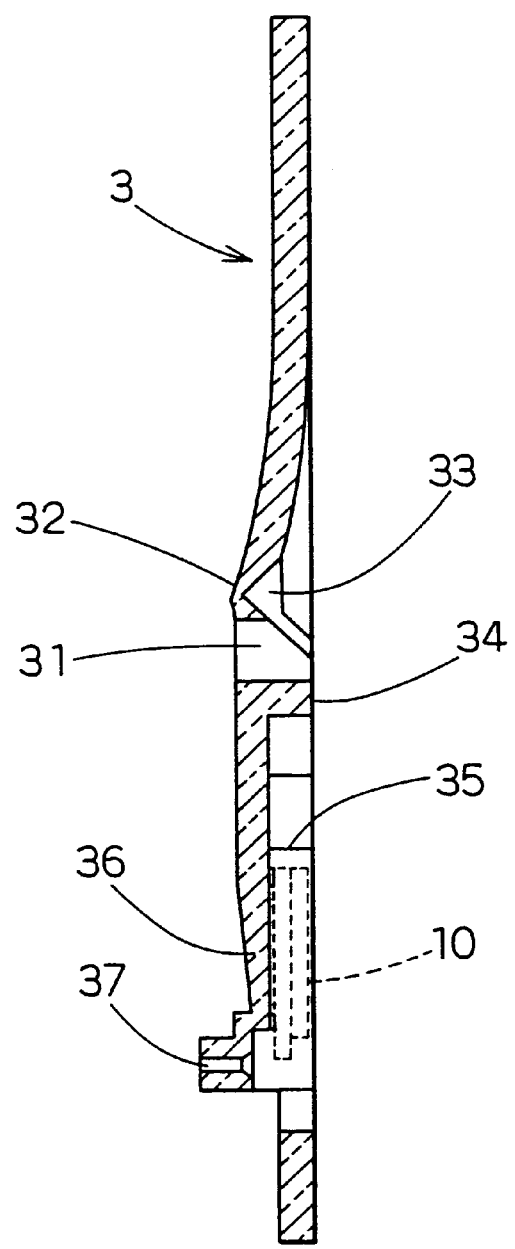
FIG. 5 is a sectional view taken along line V—V in FIG. 3.

Further, as shown in FIGS. 2–4, the light transmitting plate 3 has a first light reflecting portion 34 formed around the shaft hole 31. The first light reflecting portion 34 reflects light introduced into the light transmitting plate 3 toward a pointer 9. The first light reflecting portion 34 is formed into a substantially cylindrical shape protruding toward a front side. Further, the light transmitting plate 3 has a recess portion 35, a second light reflecting portion 36 and plural lead holes 37. The recess portion 35 is formed below the shaft hole 31, and the liquid crystal display (LCD) 10 used as an odometer is inserted into the recess portion 35. As shown in FIG. 5, the second light reflecting portion 36 is formed on a rear side of the recess portion 35 to have a plate shape with a tapered portion. The second light reflecting portion 36 reflects light introduced into the light transmitting plate 3 to illuminate the LCD 10 from back. The lead holes 37 are formed below the second light reflecting portion 36. Each lead to be connected to a terminal of the LCD 10 passes through each of the lead holes 37.

Referring back to FIG. 2, the drive unit 5 is a cross-coil-type drive unit, for example. The pointer 9 has a base portion and a pointer body 9a extending from the base portion. The dial plate 2 has a center hole formed corresponding to the shaft hole 31. The base portion of the pointer 9 is inserted into the center hole of the dial plate 2 and the shaft hole 31 to be engaged with an end portion of the pointer shaft 7. The pointer body 9a is made of a light transmitting material, and has a light introduction portion 9c formed on a rear surface thereof adjacent to the base portion. Light reflected by the first light reflecting portion 34 enters the pointer body 9a from the light introduction portion 9c. The pointer body 9a reflects the light toward a front side so that the pointer body 9a is illuminated. A front side surface of the pointer body 9a adjacent to the base portion is covered by a pointer cover 9b. The tachometer 200 also has a substantially similar illumination structure as that of the speedometer 100.

Figure 6:
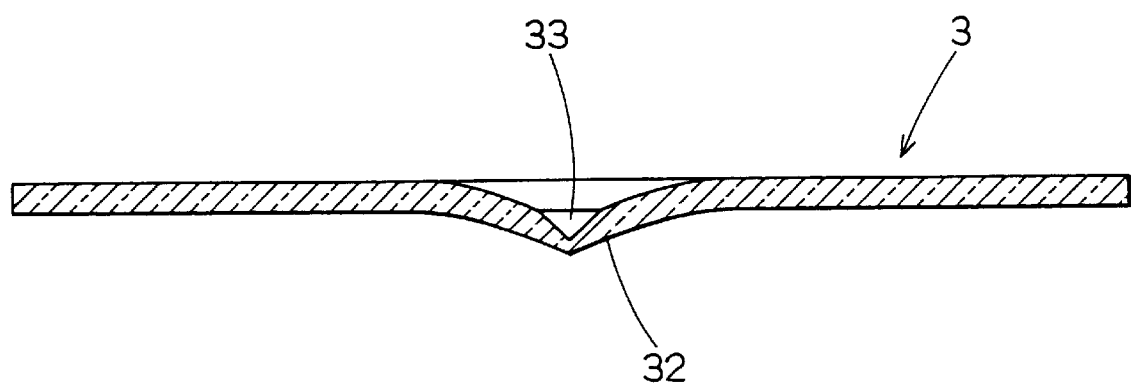
FIG. 6 is a sectional view taken along line VI—VI in FIG. 3.
Figure 7:
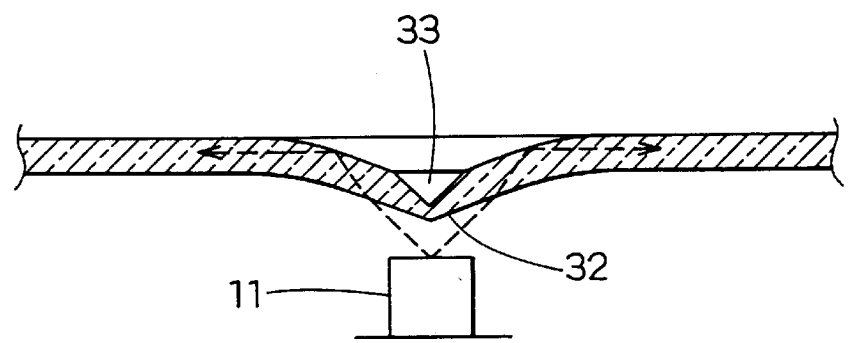
FIG. 7 is a schematic view showing incidence of light from a light source to a convex portion of the light transmitting plate according to the present invention.

According to the present embodiment, when the light source 11 is lit, light emitted by the light source 11 enters the light transmitting plate 3 from the convex portion 32. Referring to FIGS. 6 and 7, since the convex portion 32 is formed into a substantially conical shape and forms the concave portion 33 at the reverse side thereof, light from the light source 11 enters the light transmitting plate 3 at a sufficiently large incidence angle such as 120° or over. As a result, even when the light source 11 is a single LED, a sufficient amount of light enters the light transmitting plate 3. Light entering the light transmitting plate 3 travels radially therein, and is emitted toward a front side of the speedometer 100 through the translucent indication marks 2a and graduations 2b of the dial plate 2. As a result, the indication marks 2a and graduations 2b are illuminated from back to be clearly displayed.

Further, light travelling in the light transmitting plate 3 is reflected by the first light reflecting portion 34, and is introduced into the pointer 9 from the light introduction portion 9c. The pointer body 9a reflects the light introduced into the pointer 9 toward a front side of the pointer 9, thereby illuminating the pointer 9. Light travelling in the light transmitting plate 3 is also reflected by the second light reflecting portion 36 toward the LCD 10. As a result, the LCD 10 is also illuminated from back.

Thus, in the present embodiment, since the convex portion 32 is formed into a substantially conical shape forming the concave portion 33 at the front side thereof, and is disposed at a substantial center of the dial plate 2 and the light transmitting plate 3, a sufficient amount of light enters the entire light transmitting plate 3 even when the light source is a single small LED. Therefore, the indication marks 2a and graduations 2b of the dial plate 2, the pointer 9 and the LCD 10 are sufficiently illuminated by the single light source 11, and the number of parts and manufacturing cost of the speedometer 100 are reduced.

The convex portion 32 may be formed at a right or left side of the shaft hole 31 corresponding to positions of the indication marks 2a which need to be illuminated on the dial plate 2. That is, the convex portion 32 may be shifted toward the indication marks 2a, so that the indication marks 2a are sufficiently illuminated by a single light source. Further, the LCD 10 may display time, temperature and so on. Furthermore, the pointer 9 may have a light source attached to the base portion thereof. In this case, light does not need to be introduced into the pointer 9 from back.

Although the present invention has been fully described in connection with a preferred embodiment thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A meter comprising:
   a dial plate including a translucent indication mark;
   a pointer disposed at a front side of the dial plate;
   a drive unit for driving the pointer, the drive unit having a shaft protruding from the drive unit;
   a light transmitting plate disposed at a rear side of the dial plate, the light transmitting plate including a shaft hole into which the shaft is inserted to be engaged with the pointer, and a convex portion disposed in the vicinity of the shaft hole, the convex portion being formed into a substantially conical shape protruding toward a rear side of the light transmitting plate; and
   a light source disposed to face the convex portion for emitting light, wherein:
   the convex portion is disposed closer to the shaft hole than the translucent indication mark.

2. The meter according to claim 1, wherein said light source is comprised of at least one light emitting diode.

3. The meter according to claim 1, wherein:
   the convex portion is disposed to be shifted toward the indication mark from the shaft hole.

4. The meter according to claim 1, wherein the light source includes a light-emitting diode.

5. The meter according to claim 1, wherein the light transmitting plate is made of transparent synthetic resin.

6. The meter according to claim 1, wherein the light transmitting plate is comprised of at least one of acrylic acid resin and polycarbonate.

7. The meter according to claim 1, wherein said light source is comprised of a plurality of light emitting diodes.

8. The meter according to claim 1, wherein:
   the pointer is made of a light transmitting material; and
   the light transmitting plate includes a first light reflecting portion formed around the shaft hole to protrude toward the pointer for reflecting light toward a base portion of the pointer.

9. The meter according to claim 8, the first light reflecting portion is formed into a substantially cylindrical shape.

10. The meter according to claim 1, wherein the convex portion forms a concave portion at a front side of the convex portion.

11. The meter according to claim 10, wherein the concave portion communicates with the shaft hole.

12. The meter according to claim 1, further comprising:

a liquid crystal display disposed in the dial plate, wherein the light transmitting plate includes a second light reflecting portion disposed at a rear side of the liquid crystal display for reflecting light toward the liquid crystal display.

13. The meter according to claim 12, wherein:

the second light reflecting portion is formed into a plate shape and has a recess portion at a front side surface thereof; and the liquid crystal display is inserted into the recess portion.

14. A meter including a pointer shaft comprising:

a dial plate including a translucent indication mark;

a light transmitting plate disposed at a rear side of the dial plate, the light transmitting plate including, a circular plate portion having a shaft hole into which the pointer shaft is inserted;

a convex portion disposed in the vicinity of the shaft hole, the convex portion formed into a substantially conical shape protruding from the circular plate portion and forming a concave portion at a front side of the convex portion, and a substantially cylindrical protruding portion disposed around the shaft hole and protruding from the circular plate portion toward a front side of the circular plate portion, for reflecting light toward the front side of the circular plate portion; and a light source disposed to face the convex portion for emitting light, wherein the convex portion is disposed close to the shaft hole more than the translucent indication mark.

15. The meter according to claim 14, wherein said light source is comprised of at least one light emitting diode.

16. The meter according to claim 14, wherein the circular plate portion includes a recess portion into which a liquid crystal display is inserted.

17. The meter according to claim 14, wherein said light source is comprised of a plurality of light emitting diodes.

* * * * *